(12) United States Patent
Isaji

(10) Patent No.: US 7,034,745 B2
(45) Date of Patent: Apr. 25, 2006

(54) RADAR APPARATUS EQUIPPED WITH ABNORMALITY DETECTION FUNCTION

(75) Inventor: Osamu Isaji, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 213 days.

(21) Appl. No.: 10/792,618

(22) Filed: Mar. 3, 2004

(65) Prior Publication Data

US 2004/0222919 A1 Nov. 11, 2004

(30) Foreign Application Priority Data

Mar. 4, 2003 (JP) .............................. 2003-057534

(51) Int. Cl.
*G01S 7/40* (2006.01)

(52) U.S. Cl. ...................... 342/173; 342/159; 342/109; 342/111; 342/196

(58) Field of Classification Search .......... 342/89–103, 342/118, 128–133, 165–175, 192–197, 104–117, 342/159, 162

See application file for complete search history.

(56) References Cited

U.S. PATENT DOCUMENTS

| | | | | |
|---|---|---|---|---|
| 3,839,718 A | * | 10/1974 | Bowman-Manifold | 342/130 |
| 5,164,784 A | * | 11/1992 | Waggoner | 356/28.5 |
| 5,841,393 A | * | 11/1998 | Saito et al. | 342/165 |
| 6,072,422 A | * | 6/2000 | Yamada | 342/70 |
| 6,795,012 B1 | * | 9/2004 | Nakanishi et al. | 342/70 |
| 6,825,799 B1 | * | 11/2004 | Isaji | 342/173 |
| 2002/0180633 A1 | * | 12/2002 | Nakanishi et al. | 342/70 |
| 2004/0174293 A1 | * | 9/2004 | Isaji | 342/92 |
| 2004/0222919 A1 | * | 11/2004 | Isaji | 342/70 |

OTHER PUBLICATIONS

"Digital signal processing for doppler radar signals", Schaefer, R.; Schafer, R.; Mersereau, R. Acoustics, Speech, and Signal Processing, IEEE International Conference on ICASSP '79. vol. 4, Apr. 1979 P(s): 170-173.*

\* cited by examiner

*Primary Examiner*—John B. Sotomayor
(74) *Attorney, Agent, or Firm*—Christie, Parker and Hale, LLP

(57) ABSTRACT

Disclosed is a radar apparatus equipped with a function for detecting an FM-AM conversion noise peak. When the direction of radiation is swept, any peak whose level remains substantially unchanged is judged to be a peak due to FM-AM conversion noise. Further, when FM modulation is stopped, any peak appearing in a region not lower than 50 kHz is judged to be a noise peak.

15 Claims, 3 Drawing Sheets

RADAR APPARATUS EQUIPPED WITH ABNORMALITY DETECTION FUNCTION

CROSS-REFERENCE TO RELATED APPLICATION

This application claims priority of Japanese Patent Application No. 2003-057534, filed on Mar. 4, 2003.

BACKGROUND OF THE INVENTION

1. Field of the Invention

The present invention relates to a radar apparatus equipped with an abnormality detection function, and more particularly to an FM-CW radar apparatus equipped with a noise peak detection function.

2. Description of the Related Art

An FM-CW radar radiates forward transmitted waves frequency-modulated by a modulating signal of triangular waveform alternating cyclically between an upsweep section and a downsweep section, and produces a beat signal by mixing the waves reflected from a target with a portion of the transmitted waves. When the frequency of the beat signal in the downsweep section is denoted by $f_b(down)$ and the frequency of the beat signal in the upsweep section by $f_b(up)$, the beat frequency $f_r$ due to the distance to the target and the beat frequency $f_d$ due to the relative velocity of the target are respectively calculated as $$f_r = (f_b(down) + f_b(up))/2 \quad (1)$$

$$f_d = (f_b(down) - f_b(up))/2 \quad (2)$$

From these, the distance R to the target and the relative velocity V of the target can be respectively calculated as $$R = c \cdot f_r \cdot T / 4\Delta F \quad (3)$$

$$V = c \cdot f_d / 2f_0 \quad (4)$$

(where c is the velocity of light, T is the period of the triangular wave, $\Delta F$ is the frequency modulation width (frequency shift width), and $f_0$ is the center frequency.) Therefore, the values of $f_b(down)$ and $f_b(up)$ associated with each target are determined from the peaks appearing in the beat signal spectrum in the frequency domain obtained by Fourier transforming the beat signal, and the distance and the relative velocity of the target are determined using the equations (1) to (4).

In FM-CW radars, if the output or input/output characteristics of devices such as oscillators, mixers, etc. have frequency characteristics (frequency dependence), the transmit wave and the local signal are AM modulated due to the FM modulation of the transmit wave, and FM-AM conversion noise occurs. If this FM-AM conversion noise is contained in the beat signal, a noise peak appears in the Fourier transform result in addition to the peaks related to $f_b(down)$ and $f_b(up)$ described above. This can degrade signal detection accuracy and can cause false recognition. Accordingly, some means must be provided to detect noise peaks including the peak due to the FM-AM conversion noise.

SUMMARY OF THE INVENTION

It is, accordingly, an object of the present invention to provide a radar apparatus, equipped with a noise peak detection function, at low cost.

A first radar apparatus according to the present invention comprises: a measuring unit measuring a target's distance and relative velocity by analyzing a peak appearing in a Fourier transform result of a beat signal produced between a frequency-modulated transmit wave and a reflected wave thereof; a unit sweeping a beam direction electrically or mechanically; a unit recognizing a noise peak based on a change occurring in the Fourier transform result during the beam direction sweeping.

A second radar apparatus according to the present invention comprises: a measuring unit measuring a target's distance and relative velocity by analyzing a peak appearing in a Fourier transform result of a beat signal produced between a frequency-modulated transmit wave and a reflected wave thereof; a unit substantially stopping the frequency modulation of the transmit wave; and a unit recognizing a peak as being a noise peak when the peak appears at a frequency position higher than a predetermined threshold value while the frequency modulation is substantially stopped.

DESCRIPTION OF THE PREFERRED EMBODIMENTS

Figure 1:
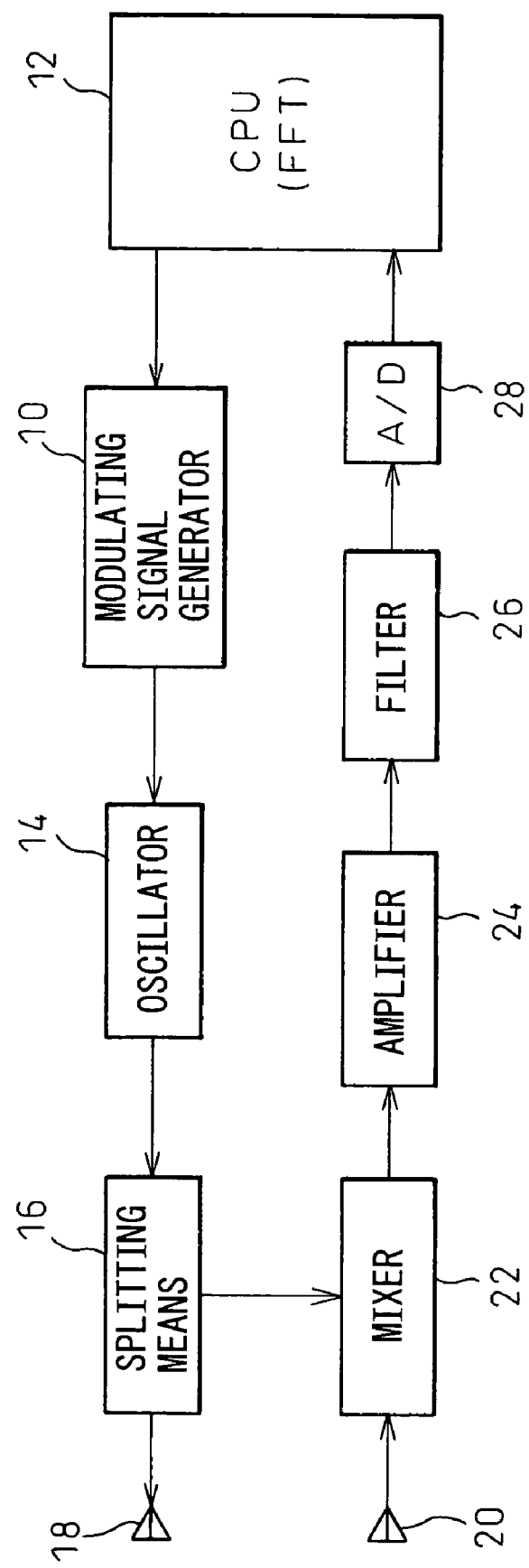
FIG. 1 is a diagram showing the configuration of an FM-CW radar to which the present invention is applied.

FIG. 1 shows the configuration of an FM-CW radar apparatus equipped with an abnormality detection function according to one embodiment of the present invention.

In FIG. 1, a modulating signal generator 10, under instruction from a CPU 12, generates a modulating signal of triangular waveform alternating cyclically between an upsweep section and a downsweep section. A voltage-controlled oscillator 14 generates a transmit wave comprising a continuous signal frequency-modulated by the triangular wave. A portion of the output of the voltage-controlled oscillator 14 is separated by a splitting means 16 and introduced into the receiver side, while the major portion thereof is radiated forward from an antenna 18. The wave reflected by a target located forward is received by an antenna 20, and mixed in a mixer 22 with the portion of the transmitted wave to produce a beat signal. The beat signal produced in the mixer 22 is amplified by an amplifier 24, passed through a filter 26 for removal of unwanted components, and converted by an A/D converter 28 into a digital signal which is supplied to the CPU 12. In the CPU 12, a fast Fourier transform (FFT) operation is applied to the digitized beat signal to transform it to the frequency domain and, then, the distance R and the relative velocity V of each target are calculated in accordance, for example, with the previously given equations (1) to (4).

Figure 2:
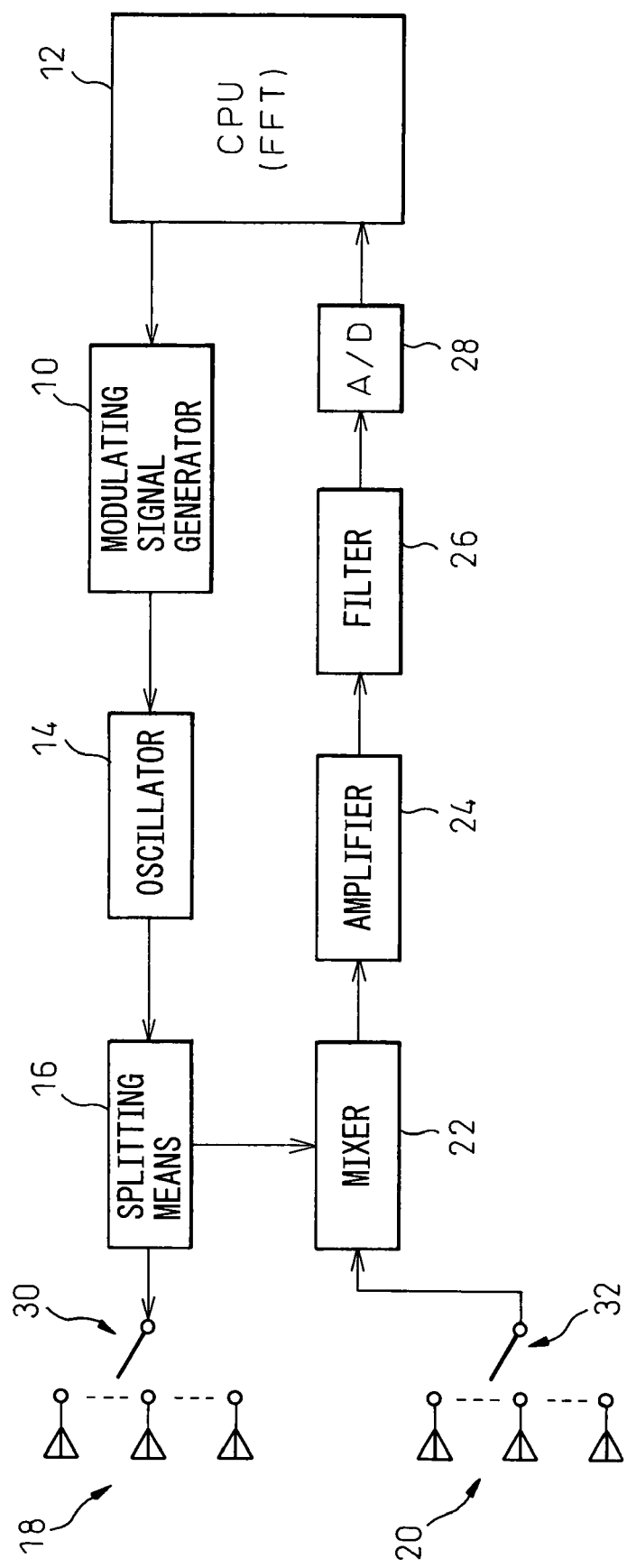
FIG. 2 is a diagram showing an FM-CW radar equipped with a function for electronically sweeping the direction of radiation.

A certain type of automotive FM-CW radar is capable of detecting the lateral position X (=R sin θ) of a target by electronically sweeping the directions of the transmitting antenna 18 and the receiving antenna 20 by means of switches 30 and 32 as shown in FIG. 2, or by mechanically sweeping the directions of the antennas by means of a motor.

Figure 3:
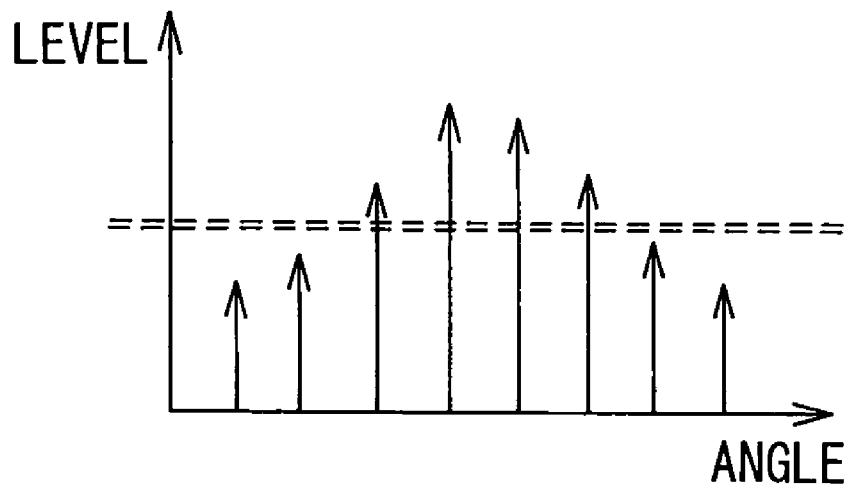
FIG. 3 is a diagram showing normal peaks when the direction of radiation is swept.

In that case, normal peaks due to reflections from a target exhibit a peculiar pattern such that, when swept over an angle θ, the peak level is the largest in the direction of the target, the level sloping off toward both ends, as shown in FIG. 3. On the other hand, in the case of noise peaks due to FM-AM conversion noise, etc., the peak level is substantially constant irrespective of the angle θ. In view of this, a threshold value is set as shown, and when swept over the angle θ, any peak whose level is larger than the threshold at all times or exceeds the threshold at a rate larger than a predetermined rate is judged to be a peak due to noise.

This judgment process can be implemented as a software program to be executed by the CPU 12 (FIG. 1).

The result of the FFT is output in the form of a complex number comprising a real part (Re) and an imaginary part (Im), and the value of the level is calculated by $\sqrt{(Re^2+Im^2)}$, while the value of the phase is calculated by $\tan^{-1}(Im/Re)$. In the above description, any peak whose level remains substantially unchanged when swept over the angle θ is judged to be a noise peak, but alternatively, any peak whose phase at the peak's frequency remains substantially unchanged when swept over the angle θ may be judged to be a noise peak.

In particular, when the main purpose is the detection of FM-AM conversion noise, since FM-AM conversion noise appears in a specific region in the low-frequency range, the judgment may be made only on peaks that appear in such a specific region. Further, when amplifier gain is usually set low for such a specific region, an accurate judgment can be achieved by setting the gain for that region or the overall gain higher than usual. Changing the gain can be accomplished by switching the amplifier to be used or by changing the settings of the AGC amplifier. Further, the accuracy of abnormal peak detection improves if the threshold value for detecting peaks in the spectrum is set higher at the time of the abnormal peak detection than at the time of normal use. If the peak level detected in the spectrum is high, the level may saturate and may remain unchanged even in the case of a peak associated with a target; in this case, the amplifier gain should be reduced.

When a noise peak is detected in the above judgment process, it is desirable that the detection process be repeated several times (equivalent to several scans), and that the peak, if detected a predetermined number of times in succession, be judged to be a peak due to noise.

Alternatively, when a noise peak is detected in the judgment process, the detection process may be repeated several times (equivalent to several scans), and the peak may be judged to be a peak due to noise if the peak has been detected with a frequency greater than a predetermined frequency.

In the normal process, if a peak appears in the frequency band equivalent to that of the peak judged to be a noise peak in the noise judgment process, that peak may be judged to be a peak due to noise.

Figure 4:
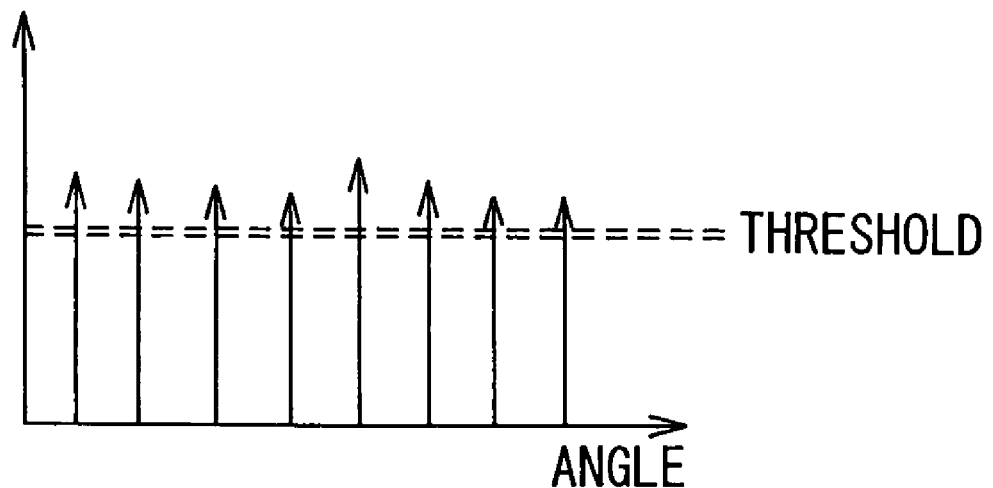
FIG. 4 is a diagram showing abnormal peaks when the direction of radiation is swept.

When the FM modulation is stopped or the modulation width is made infinitely small under instruction from the CPU 12 to the modulating signal generator 10 (FIGS. 1 and 4), only Doppler frequency peaks due to relative velocity appear in the spectrum obtained by Fourier transform. Even if the upper limit of the relative velocity is assumed to be 400 km/h, its frequency is 40 kHz or lower. Therefore, in this case, any peak appearing in the frequency region not lower than 50 kHz, for example, can be regarded as a noise peak. In this way, noise peaks other than the FM-AM conversion noise can be detected.

As described above, according to the present invention, there is provided a radar apparatus equipped with a noise peak detection function.

The invention claimed is:

1. A radar apparatus equipped with an abnormality detection function, comprising:
   a measuring unit measuring a target distance and a relative velocity by analyzing a peak appearing in a Fourier transform result of a beat signal produced between a frequency-modulated transmit wave and a reflected wave thereof;
   a sweeping unit sweeping a beam direction electrically or mechanically; and
   a recognizing unit recognizing a noise peak based on a change occurring in the Fourier transform result during the sweeping of the beam direction.

2. A radar apparatus according to claim 1, wherein the recognizing unit recognizes a peak whose intensity in the Fourier transform result remains substantially unchanged during the sweeping of the beam direction as being a noise peak.

3. A radar apparatus according to claim 1, wherein the recognizing unit recognizes a peak whose phase in the Fourier transform result remains substantially unchanged during the sweeping of the beam direction as being a noise peak.

4. A radar apparatus according to claim 1, wherein the recognizing unit sets a specific frequency region as a target region for recognition of a noise peak.

5. A radar apparatus according to claim 1, wherein the recognizing unit sets a peak appearing within a specific frequency region as a target peak for recognition of a noise peak.

6. A radar apparatus according to claim 1, wherein the recognizing unit judges a noise peak by changing an amplifier characteristic in a specific frequency region.

7. A radar apparatus according to claim 6, wherein the recognizing unit judges a noise peak by changing the amplifier characteristic in such a manner as to change an amplifier gain.

8. A radar apparatus according to claim 1, wherein the recognizing unit judges a noise peak by changing a threshold value for peak detection.

9. A radar apparatus according to claim 6, wherein the recognizing unit changes the amplifier characteristic by switching an amplifier to be used.

10. A radar apparatus according to claim 6, wherein the recognizing unit changes the amplifier characteristic by changing a setting on an AGC amplifier.

11. A radar apparatus according to claim 1, wherein the recognizing unit judges a noise peak by reducing an amplifier gain when a level of a detected peak is higher than a predetermined value.

12. A radar apparatus according to claim 1, wherein the recognizing unit conclusively judges a peak to be a noise peak when the peak has been judged to be a noise peak a plurality of times in succession.

13. A radar apparatus according to claim 1, wherein the recognizing unit conclusively judges a peak to be a noise peak when the peak has been judged to be a noise peak with a frequency greater than a predetermined frequency.

14. A radar apparatus according to claim 1, wherein the recognizing unit judges a peak to be a noise peak when the peak appears in a frequency band equivalent to a frequency band where a peak has previously been judged to be a noise peak.

15. A radar apparatus equipped with an abnormality detection function, comprising:

a measuring unit measuring a target's distance and relative velocity by analyzing a peak appearing in a Fourier transform result of a beat signal produced between a frequency-modulated transmit wave and a reflected wave thereof;

a unit substantially stopping the frequency modulation of the transmit wave; and a recognizing unit recognizing a peak as being a noise peak when the peak appears at a frequency position higher than a predetermined threshold value while the frequency modulation is substantially stopped.

* * * * *